Nov. 6, 1956  V. L. HUDSON ET AL  2,769,604
AIRCRAFT FLIGHT REFUELING APPARATUS
Filed April 3, 1950  2 Sheets-Sheet 1
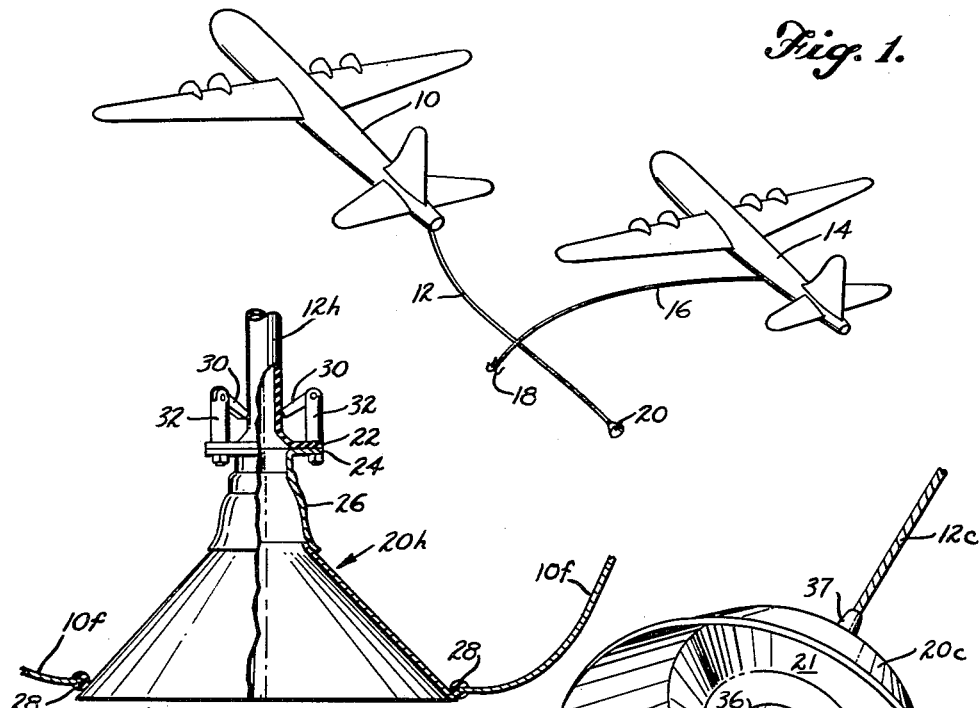
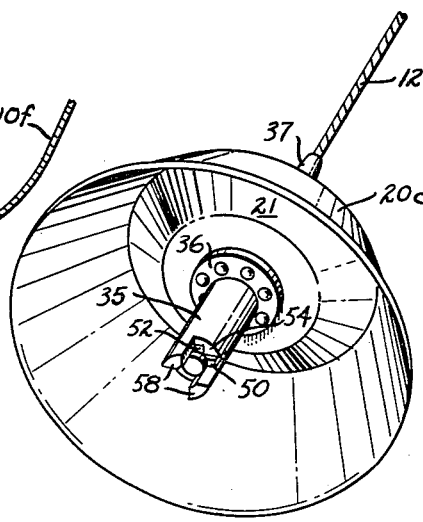
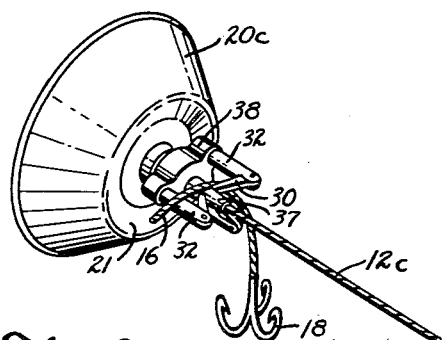
INVENTORS
VERNE L. HUDSON &
JAMES M. WICKHAM
BY
Reynolds, Beach & Christensen
ATTORNEYS Nov. 6, 1956  V. L. HUDSON ET AL  2,769,604
AIRCRAFT FLIGHT REFUELING APPARATUS
Filed April 3, 1950  2 Sheets-Sheet 2

INVENTORS
VERNE L. HUDSON
& JAMES M. WICKHAM
BY
ATTORNEYS

United States Patent Office 2,769,604
Patented Nov. 6, 1956

2,769,604

AIRCRAFT FLIGHT REFUELING APPARATUS

Verne L. Hudson, Wichita, Kans., and James M. Wickham, Seattle, Wash.; said Hudson assignor to Boeing Airplane Company, Wichita, Kans., a corporation of Delaware Application April 3, 1950, Serial No. 153,533

1 Claim. (Cl. 244—135)

This invention relates to apparatus for refueling of aircraft in flight, and more particularly to the type of aerial refueling apparatus in which a dragline trailing from the receiver aircraft requiring fuel is caught by a contact line projected from the tanker or supply aircraft for establishing a hose connection between them. Such manipulation of a dragline is conventional, and is described herein only as illustrative of a typical use of the novel dragline stabilizing element disclosed herein. For broad purposes of the invention it is immaterial which of the two aircraft carries the refueling hose, and the connection between the aircraft may be made for transferring materials other than fuel, if desired.

In one case, for instance, the fuel transfer hose may constitute the dragline which is caught and drawn to the tanker aircraft. In another case, the dragline is a cable which, when caught by the contact line projected from the tanker aircraft, serves as a means of drawing a refueling hose from the tanker aircraft to the receiver aircraft. In still a third case, the dragline comprises a cable which, when caught by the contact line, constitutes a pilot line for drawing the refueling hose from the receiver aircraft into the tanker aircraft.

The present invention is concerned chiefly with a novel means for improving the certainty and increasing the facility of this general dragline contact method of aerial refueling, being directed specifically to stabilization of the dragline in its flight position trailing from the receiver aircraft, to facilitate making the contact. The stabilizing influence of the novel means employed to accomplish such a result is to suppress whip, oscillation or flutter of the dragline and steady its trailing end to facilitate grapnelling thereof by the contact line which is projected across and slides down the dragline to form the connection, and generally improve the certainty and facility of the initial contact-making operation.

Another object of the invention is to provide a quick coupler for connecting the novel stabilizer element positively to the end of the dragline and for releasing it as quickly therefrom.

A further object is to insure that on substantially every try the contact line will be projected across the dragline and slide smoothly cross-wise down the latter to its end where it will be caught for establishing a positive connection between the two lines.

With these and other considerations in mind, the invention, briefly described, comprises a dragline stabilizer element in the form of a generally bell-shaped member which flares rearwardly and is adapted at its forward, smaller end for connection centrally thereof to the dragline. In the preferred case, the surface of this element to the wind is formed as a right circular cone or frustum of a cone, the angle of generation of such cone being in the vicinity of 45 degrees. As specifically illustrated herein, such a stabilizer element may be adapted for connection to a dragline consisting of a cable or the like, or a dragline which is the fuel transfer hose itself.

A further feature of the invention resides in the coupling means for securing the stabilizer element to the dragline, which includes a bayonet-type connection. A spring-finger latch cluster is located somewhat ahead of the stabilizer element to catch and hold the downwardly sliding contact line for establishing a positive connection between the lines.

These and other features, objects and advantages of the invention, including certain details of construction of preferred forms thereof, will now be described in detail by reference to the accompanying drawings.

Figure 1 is a top perspective view of a receiver airplane and a tanker airplane performing the initial contact maneuver in which the contact line is shot across the dragline for establishing the connection.

Figure 2 is a sectional side view of the stabilizer element in a form adapted for connection to a refueling hose dragline, which element is shown in its stowed position seated against the rim of an aperture in the fuselage shell.

Figure 3 is an isometric view of the preferred form of a stabilizer element connected to the end of a cable dragline, the view illustrating the manner in which grapnelling occurs between the two lines, such view being taken from a forward aspect. Figure 4 is an isometric view of the same, but taken from a rear aspect.

Figure 6:
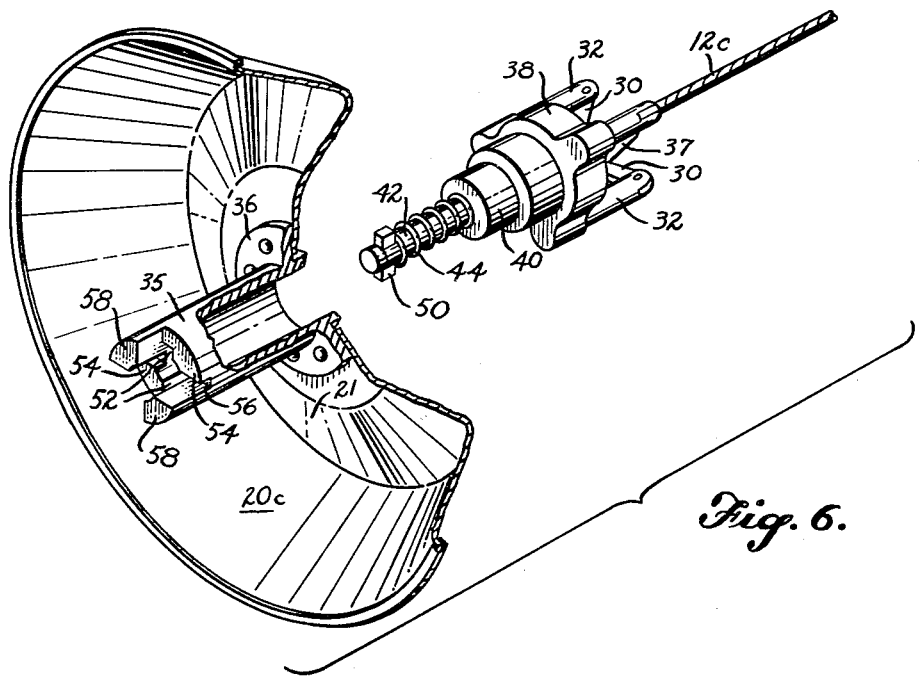
Figure 6 is an exploded isometric view with parts broken away to show further details of the coupling means.

In the system of aerial refueling of instant concern the receiver airplane 10 requiring fuel maintains level flight preferably at a speed not over about 200 miles per hour and lets out a dragline 12. The tanker airplane 14 carrying fuel comes in toward the receiver airplane at a slightly lower elevation and somewhat off to the side, in which position, as shown in Figure 1, it shoots a contact line 16 over and across the dragline 12. The contact line 16 impelled by wind force then slides rapidly crosswise down the dragline 12. When it reaches the trailing lower end of the dragline, it is stopped there and caught by latch means to be described, whereupon it may run lengthwise through such means until its grapnel reaches such latch means and forms a positive grapnel connection between the lines.

Preferably the contact line 16 carries a hook type grapnel 18, while the end of the dragline carries a spring-finger latch cluster in conjunction with a stabilizer element 20. In Figure 2, the dragline designated 12h constitutes a fuel transfer hose trailed from the receiver airplane. In its simplified illustrated form, such a hose terminates in annular coupling flange 22 which is bolted to a matching flange 24 formed on the forward or apex end of the rearwardly flared generally bell-shaped or conical drag element 20h. This drag element is preferably of sheet metal construction and has a flare angle of the order of 90 degrees as shown. In a typical case, it would be about 1 foot in diameter at its base end. For convenience in manufacture, its apex end is formed as a forward extension of its general body portion by a separate piece 26 carrying the flange 24.

While such a cone may be stowed in various ways and let out on the end of the dragline of the receiver aircraft according to various techniques, I have chosen to illustrate a stowage arrangement in which the base of the cone normally seats against the rubber moulding 28 on the rim of a circular aperture formed in the bottom surface 10f at the rear of the fuselage tail. The cone thereby closes the aperture when in stowed position and its forward edge may project slightly beyond the surface of the fuselage to be caught by the slipstream as soon as the cone is released. The resulting wind force on the drag cone aids in drawing the hose 12h from its reel in the receiver aircraft.

After the hose is fully extended as shown in Figure 1, the conical drag element 20 produces a steady, direct axial pull in the dragline and, tending to follow a steady course as a result of its general symmetry, greatly reduces the tendency of the line to whip or flutter. Moreover its drag straightens most of the length of the dragline into alignment with the flight path, and in that respect greatly facilitates catching of the contact line 16 as it slides cross-wise to the end of the dragline, it being noted that any tendency for the trailing end of the dragline to droop appreciably or flutter makes it less certain that the contact line will be caught instead of sliding past or jumping over the end of the dragline.

The latch means shown in Figure 2 for catching and holding the contact line when it slides to the end of the dragline comprises a cluster of latch-fingers 30 mounted in equi-angular relationship about the common axis of the drag cone 20h and the dragline 12h, such fingers being supported pivotally by the posts or studs 32 anchored to the joined flanges 22 and 24. These fingers bear inwardly and somewhat rearwardly in relation to the dragline and cone axis from their pivots and are normally urged by springs 34 (Figure 5) into contact with a central element representing the dragline 12h or an extension thereof as in the modified form later described herein. They are free to be swung rearward by moderate force to admit the rearwardly sliding contact line into the space between the fingers and the flange 22. Since the fingers are spring-urged toward the central member or dragline, the contact line, once having entered the space behind any one of the fingers, is trapped thereby and cannot slide forwardly past the fingers. When the contact line 16 then slides lengthwise through this space until its hook grapnel 18 reaches the latch cluster, it will be certain to catch on one of the posts 32, the dragline itself, or a latch finger to form a positive connection, being too large to pass through any one of the enclosures defined between the flange 22, any post 32, its finger 30 and the adjacent surface of the dragline.

Figure 5:
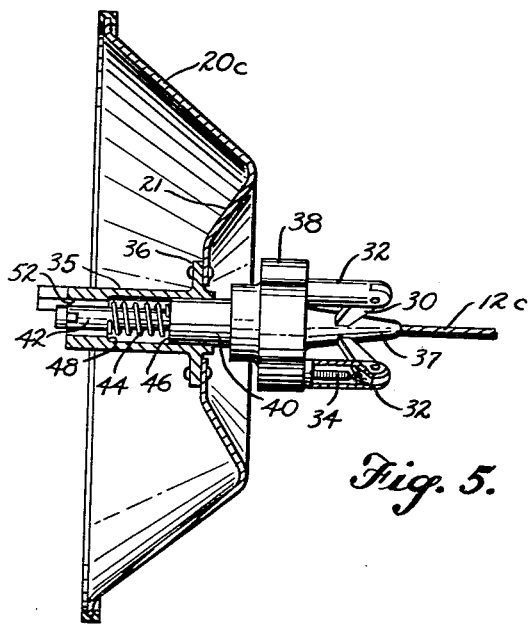
Figure 5 is a longitudinal sectional view of the stabilizer element connected to the trailing end of the dragline and particularly showing the details of the coupling means including the bayonet connection and the pawl type grapnel.

This grapnelling action may be seen more clearly in Figure 3 in which the conical drag element is shown in a form adapted for connection to a cable dragline 12c, but includes the same general latch cluster mechanism including the fingers 30 and the posts 32. In Figure 5 the cutaway portion of one of the posts 32 reveals the interior location of the latch finger springs 34.

In this modified form of dragline stabilizer element, 20c, the cone body is more definitely of frustum form, turning inward forward of its base to form a transverse flange or web 21 rather than continuing forward substantially to an apex as in the form shown in Figure 2. The central portion of the web 21 lies in a plane generally perpendicular to the axis of the cone and has a central aperture, while the outer portion of this flange inclines somewhat forwardly to join the forward end of the general body of the cone, thereby creating a saucer or depression in the forward end of the stabilizer element as shown in Figure 5. This construction gives strength andn rigidity to the drag cone as a whole.

A drag cone coupling sleeve 35 has an annular flange 36 riveted or otherwise secured to the cone web 21 in coaxial alignment with its aperture. A bayonet connection is formed between this sleeve and coupling means carried by the end of the dragline 12c as will be described. Such a coupling means cooperable with the sleeve 35 is formed as a part of a single unit including the latch cluster which incorporates the fingers 30, the posts 32, the central member 37 contacted by the fingers and faired gradually into the dragline, and the annular base member 38 carrying such posts and the central member 37. Rearwardly of this base member 38 is a postlike axial projection 40, having and end portion 42 of reduced diameter encircled by a helical spring 44. The larger diameter portion of the post 40 slidably engages the inner wall of the coupling sleeve 35 fastened to the cone. The rearward portion of the sleeve bore is reduced in diameter to pass the reduced end portion 42 of the post but not the spring 44, the latter being retained between and seating on the step or shoulder 46 at the change in diameter of the post 40 and the step or shoulder 48 at the change in diameter of the sleeve bore.

As shown best in Figure 6, the end of the post carries a crosspiece 50, the ends of which project laterally outward from opposite sides of the reduced diameter portion 42 near its rear extremity, while the sleeve is provided with complemental longitudinal grooves or keyways 52 to pass such projections for lengthwise insertion and retraction movement of the post through the sleeve. By sliding the post into the sleeve until the crosspiece 50 emerges from the rearward ends of the grooves 52 the post may be rotated in one direction through an angle until the crosspiece projecting ends, sliding on sector end faces 54, come into registry with the radial notches 56. The spring 44 having been compressed in order to press the post 40 inward of the sleeve to disengage the crosspiece 50 from grooves 52 for rotation to notches 56, urges the post in the opposite direction to cause the projecting ends of the crosspiece 50 to seat in the respective notches 56. The drag cone is released from the dragline coupler by a reverse sequence of movements. In the innermost position of the post 40, the sector-shaped projections 58 on the sleeve's rearward end confine rotational movement of crosspiece 50 to a range between release and locking positions as described above. With this type of arrangement, it will be evident that the drag cone may be coupled quickly to the dragline or as quickly released.

In the foregoing description and in the claim it should be understood that, except as otherwise indicated or required by the context, the usage of the word "cone" or its derivatives is in the most general sense of the word and is intended to include, in the broad aspect of the invention, equivalent symmetrical or regular surface forms of divergent or flared members or frustums thereof, which, on the same principles as a right circular cone, will tend to follow a steady course when dragged through the air by the dragline. Regular pyramids, especially those of many-sided form, would therefore be included, as well as other generally bell-shaped or forwardly tapered surfaces whether having a uniform or somewhat varying taper. Moreover, the base of the stabilizer element may be open, as shown, or may be covered, as desired.

I claim as my invention:

In aircraft interconnecting apparatus, a dragline adapted to trail from one aircraft for contact by another aircraft; a dragline stabilizer element comprising a rearwardly divergent generally bell-shaped member on the trailing end of said dragline and having an axis of symmetry substantially coincident with the adjacent portion of the dragline, and coupling means carried by the trailing end of the dragline, forming a quickly disengageable connection between the dragline and the stabilizer element, and comprising stud means projecting rearwardly of the dragline and having a reduced-diameter elongated end portion carrying a lateral projection near its terminus, a helical spring encircling said reduced end portion between said lateral projection and the shoulder of the stud at its change of cross-section, a central sleeve carried by the smaller and forward end of the bell-shaped member, said sleeve having a stepped-diameter bore slidably engageable in its forward portion by the larger portion of the stud, and reduced in diameter over its rearward portion to pass the reduced portion of the stud while stopping said spring, the spring being compressible against the shoulder formed at the reduction in diameter of the bore by inserting the stud inwardly and rearwardly in said sleeve until said lateral projection has passed beyond the rearward end of the bore, said bore having a longitudinal groove therein to pass said projection during such insertion movement of said stud, and said sleeve further having a notch formed in its rearward end at a location offset circumferentially from said groove end to receive said lateral projection when rotated by the stud out of circumferential registry with the groove, reaction of the spring forcing the stud forwardly in relation to the sleeve and thereby holding said projection in said notch.

References Cited in the file of this patent

UNITED STATES PATENTS

| | | |
|---|---|---|
| 1,848,372 | Moran | Mar. 8, 1932 |
| 2,023,310 | Cobham | Dec. 3, 1935 |
| 2,166,575 | Atcherley | July 18, 1939 |
| 2,261,598 | Tyson | Nov. 4, 1941 |
| 2,287,257 | Lear | July 23, 1942 |

OTHER REFERENCES

"Flight" Magazine, August 23, 1945, pp. 200–204.

"Aviation Week," Magazine, August 29, 1949, pp. 18–20.

"Time" Magazine, August 22, 1949, page 54.